United States Patent Office 3,505,187
Patented Apr. 7, 1970

3,505,187
ELECTROLYTIC PROCESS FOR PREPARING AMINOPENICILLINS
Kenneth William Bertram Austin, Betchworth, and Albert Eric Bird, Dorking, England, assignors to Beecham Group Limited, Brentford, Middlesex, England, a British company
No Drawing. Filed Sept. 20, 1967, Ser. No. 669,277
Claims priority, application Great Britain, Sept. 22, 1966, 42,291/66
Int. Cl. B01k 1/00
U.S. Cl. 204—74                    13 Claims

ABSTRACT OF THE DISCLOSURE

Known aminopenicillins of the general formula

R.CH($NH_2$).CO.APA wherein —APA represents the penicillin nucleus (i.e. the 6-aminopenicillanic acid residue) and R is a phenyl, substituted phenyl or thienyl group can be prepared by the electrolytic reduction in solution of N-protected aminopenicillins of the formula R.CH(Y).CO.APA wherein Y is an azido, arylsulphonamido, arylsulphenamido, or arylcarbonylamino group.

---

This invention relates to a new process for the preparation of known amino-penicillins of the general Formula I $$\text{R-CH.CO.NH.CH-CH} \begin{array}{c} S \\ \diagup \diagdown \end{array} \begin{array}{c} CH_3 \\ C-CH_3 \end{array}$$
$$\underset{NH_2}{|} \quad \underset{O=C-N}{|} \quad \underset{CHCO_2H}{|} \quad (I)$$

wherein R is a phenyl, substituted phenyl or thienyl group and salts thereof.

These penicillins are usually prepared by reacting 6-aminopenicillanic acid (the penicillin nucleus) with an acylating compound which contains its amino group in a "protected" form, or has a different nitrogenous group such as an azido group —$N_3$ which can later be converted into an amino group. This procedure is necessary to prevent self condensation between the reactive acylating function and any free —$NH_2$ group contained within the acylating reagent. After the acylating reaction, the N-protecting group has then to be removed from the penicillin side chain under mild conditions which will not affect the rest of the molecule and in particular will not destroy the penicillin nucleus or the peptide bond between the nucleus and the 6-position side chain. The choice of N-protecting groups is limited, therefore, to groups which are removed very easily, for example by mild hydrogenation or mild hydrolysis. This prevents the use of certain common laboratory reagents which can block or protect amine groups but which cannot be removed easily under very mild conditions.

The present invention provides a method of removing certain N-protecting groups by electrolytic reduction, thereby enabling groups to be used which could not hitherto be employed in the penicillin field. The method is also applicable to the electrolytic reduction of certain groups, including the azido group, which can also be reduced by conventional mild chemical reaction.

The starting penicillins for the electrolytic reduction process of this invention, which are hereby defined as N-protected amino penicillins, are of the general Formula II $$\text{R.CH.CO.NH.CH-CH} \begin{array}{c} S \\ \diagup \diagdown \end{array} \begin{array}{c} CH_3 \\ C-CH_3 \end{array}$$
$$\underset{Y}{|} \quad \underset{O=C-N}{|} \quad \underset{CH.CO_2M}{|} \quad (II)$$

wherein R is a phenyl, substituted phenyl, or thienyl group,

—Y is an azido group (—$N_3$), an arylsulphonamido group (ArSO$_2$NH—), an arylsulphenamido group (ArS.NH—) or an arylcarbonylamino group (ArCO.NH—), and M is a hydrogen atom or a metal or ammonium or substituted ammonium ion. The preferred values of R are chosen in respect of the activities of the final penicillins desired rather than in respect of their part in the reaction. Thus a particularly preferred value of R is phenyl, which gives as the penicillin of Formula I, α-aminobenzylpenicillin which is commonly called ampicillin. The preferred values of Y are chosen in respect of the usual criteria of chemistry of availability of starting materials and ease of preparative chemistry to give the necessary starting penicillins of Formula II, as well as for their particular value in the actual process of this invention. The conditions in the process of this invention (which are discussed in more detail below) appear to be less critical when Y is an azido group and because of this versatility and also because the yields of the end product are high, an azido group is particularly preferred. Of the other values of Y, a particularly preferred arylsulphonamido group is toluene-p-sulphonamido (also called tosylamino), a particularly preferred arylsulphenamido group is o-nitrophenylsulphenamido, and particularly preferred arylcarbonylamino groups are benzamido and substituted benzamido. M will normally be a hydrogen atom, though it may with advantage be a cation, especially an alkali metal ion such as sodium, which gives more soluble penicillins in certain cases when a substantially aqueous electrolyte solvent is used.

Thus the present invention provides a new method for preparing a penicillin of Formula I which comprises the electrolytic reduction of a penicillin of Formula II.

In very simplified terms, the cathode reaction of this process might be considered as reduction by active hydrogen liberated during the electrolysis from the reaction $H^+ + e^- \rightarrow [H]$; this removal of hydrogen ions will cause the pH in the cathode compartment to rise.

Thus as an illustration of the process, when Y is an arylsulphonamido group, the reductive cleavage gives rise to an —$NH_2$ group and an arylsulphinic acid and the simplified cathode reaction may be represented as:

$$\text{R.CHCO.APA} + 2e^{\ominus} + H^{\oplus} \longrightarrow \text{R.CH.COAPA} + \text{ArSO}_2{}^{\ominus}$$
$$\underset{NH}{|} \qquad\qquad\qquad\qquad \underset{NH_2}{|}$$
$$\underset{SO_2Ar}{|}$$

wherein APA represents the penicillin nucleus $$-\text{NH-CH-CH} \begin{array}{c} S \\ \diagup \diagdown \end{array} \begin{array}{c} CH_3 \\ C-CH_3 \end{array}$$
$$\underset{O=C-N}{|} \quad \underset{CH.CO_2M}{|}$$

A convenient type of apparatus for carrying out the electrolytic reduction on a small scale is a glass vessel inside which is a small porous pot vessel. The main outer part of the glass vessel serves as a cathode compartment, the cathode consisting of a metal electrode preferably one with a high hydrogen-over-potential value such as mercury, zinc or lead or solid amalgamated metals such as lead or zinc amalgam, though silver has also been used successfully.

Any suitable anode may be used but since oxidising products are liberated (including some chlorine if a chloride electrolyte is used) which may burn up or corrode the anode a readily available cheap anode such as carbon is preferable. The porous pot containing the anode serves to separate the anode products from the cathode products, though this is probably not essential. If it is desired to cool the reaction, either a cooling coil may be used or the whole vessel may be inserted in a cooling bath.

The penicillin (II) to be reduced, together with an electrolyte to carry the current, are dissolved in a solvent which will not react with either the starting penicillin or end penicillin. Of course, the electrolyte or current carrier must be chosen as one that will not electrodeposit its cation in preference to reduction of the penicillin occurring: it must also be completely soluble in the solvent system used, as must the penicillin (II). Thus the choice of M in the penicillin (II) (which affects its solubility), the choice of electrolyte, and the choice of solvent are not independent factors, but must be considered together. When a substantially non-aqueous solvent is used, the choice of electrolyte tends to be limited by solubility considerations and quaternary ammonium salts or lithium chloride are particularly suitable, though it is a simple procedure to check solubilities for any given solvent. Since the reduction process of this invention is an electrolytic cathode reaction and in electrolysis such factors as discharge potentials of cations at various metal surfaces, over-voltage phenomena, electrode surface reactions and interaction with solvents do come into consideration, it is possible that the precise choice of electrode, solvent, and electrolyte are more critical than the above conditions imply. Indeed when reducing toluene-p-sulphonamido groups in an aqueous methanolic solvent at a mercury cathode with tetramethylammonium chloride as electrolyte, it is found that yields of the desired amino compounds start to fall off as the quantity of water rises above 30 to 50%. Thus the reader is warned that all the different factors involved in the process of this invention are closely inter-related.

The solvent for the reaction may be any common liquid which will dissolve the starting penicillin (II) and will not react chemically with it or with the end product penicillin (I). Alcohols, aqueous alcohols, aqueous acetone and water itself have been found suitable in appropriate cases. Methanol containing up to 30% by volume of water has been found particularly suitable when Y is an arylsulphoamido group. The choice of solvent does not seem to be as critical when Y is an azido group; for example in this case water alone is satisfactory. As mentioned above, when the solvent is a substantially non-aqueous one, lithium chloride and quaternary ammonium salts are suitable electrolytes and tetramethylammonium chloride is particularly suitable. When the solvent contains more water the range of electrolytes increases and ammonium salts such as ammonium sulphate and alkali metal salts such as sodium chloride and sodium sulphate have been found suitable.

When a substantially non-aqueous solvent system is used it may be necessary to have the penicillin (II) in the form wherein M is hydrogen in order to dissolve it, whereas when a substantially aqueous solvent is used it may be necessary to have M as a cation such as sodium to achieve solubility. The solubility of the end penicillin of Formula I wherein Y has been reduced to a free amino group may be quite different from that of the starting penicillin (II), and as reduction proceeds the end penicillin may be precipitated.

The optimum concentration of the electrolyte can be determined by experiment, but it must be remembered that in substantially non-aqueous solvents the current which may be passed will be limited if insufficient electrolyte is present. A suitable concentration to allow the reaction to proceed at a reasonable rate and operating at a convenient current and applied potential can be decided on by applying the usual considerations of electrolysis to the experiments. In practice when an applied potential of about 20 volts is used, electrolyte concentrations of between 4 and 30 millimoles per 35 ml. of solvent allow a current of up to 1 amp. to pass quite easily.

As reduction proceeds, the pH in the cathode compartment will rise as mentioned above. Since penicillins are unstable in strongly alkaline solution, this increase in alkalinity must be corrected by buffering or by addition of appropriate quantities of acid to the cathode compartment from time to time. In practice the latitude is large and a pH range of 1 to 9 may be employed, preferably between 2 and 7. Most conveniently, a combination pH electrode may be positioned in the cell during electrolysis and when necessary acid is added to adjust the pH; to avoid interfering too much with solubility considerations and dilution factors concentrated hydrochloric acid which may be mixed with equal parts of the appropriate organic solvent such as methanol may be used.

The anode compartment may contain water or a mixture of the same solvent and electrolyte as is used in the cathode compartment.

The electrolysis may be carried out over a wide temperature range.

The starting penicillin of Formula II containing the N-protecting group and the free aminopenicillin of Formula I are readily distinguishable by paper chromatography. Thus the progress of the reduction is conveniently followed by withdrawing small samples of the solution from time to time and subjecting them to paper chromatography. In certain cases when the starting penicillin does not interfere, use can be made of the method reported by Smith, DeGrey and Patel (Analyst, 1967, 92, 247) for estimating the end product by acid degradation in the presence of a copper salt.

In general, especially when reducing the toluene-p-sulphonamido group, it is undesirable to allow the electrolysis to proceed for longer than is necessary to produce the maximum yield of aminopenicillin. The time needed for optimum yield will of course depend on the nature and quantity of the N-protected penicillin to be reduced, and on the current passed.

At the end of the reaction the aminopenicillin may be isolated by any of the means conventionally employed for the recovery and purification of aminopenicillins. Depending on the method selected the product may be obtained as the anhydrous or hydrated zwitterion, as an acid addition salt such as the β-naphthalenesulphonate, or as a salt of the carboxyl group such as the sodium or potassium salt.

The invention is illustrated by the following examples:

EXAMPLE 1

A solution of 6[D-α-(p-toluenesulphonamido)phenylacetamido]penicillanic acid 5.04 g. (10 millimoles) and tetramethylammonium chloride (3.29 g.) in methanol (35 ml.) was electrolysed in the cathode compartment of a cell divided by a porous pot and using a mercury cathode and graphite anode. The anode compartment contained 2 mls. of water. Electrolysis was continued for 2 hrs. at a current of 1 amp. with an applied potential of about 20 volts. The cell was immersed in a cooling bath to keep the temperature of the solution in the cathode compartment at 0° to 5° C. The solution in the cathode compartment was kept at an acid pH by occasional addition of drops of concentrated hydrochloric acid.

As electrolysis proceeded a precipitate formed in the cathode compartment. At the end of electrolysis the precipitate was filtered off, washed with methanol and dried, giving 0.13 g. ampicillin (4% yield). The material was shown to be the amorphous form of ampicillin by identity of its infra-red spectrum with that of a standard sample. The filtrate contained more ampicillin, which was not isolated. This was shown to be present by paper chromatographic comparison with authentic ampicillin. An approximate estimate from the size of the chromatogram spots of the amount of ampicillin formed corresponded to conversion of 30% of starting material into ampicillin.

EXAMPLE 2

A solution of 6[D-α-(p-toluenesulphonamido)phenylacetamido]penicillanic acid (4.08 g.) and tetramethylammonium chloride (3.29 g.) in a mixture of methanol (24.5 ml.) and water (10.5 ml.) was electrolysed for 2 hrs. in the cathode compartment of a cell under the conditions described in Example 1. Filtration at the end of electrolysis gave 0.44 g. ampicillin (15.5% yield), Paper chromatograms showed the presence of more ampicillin in the filtrate.

EXAMPLE 3

6(D - α - benzamidophenylacetamido)penicillanic acid (2.88 g.) and tetramethylammonium chloride (3.39 g. 7.48 millimoles) were dissolved in 35 mls. methanol and electrolysed under the conditions of Example 1. No precipitation of ampicillin occurred but paper chromatograms showed the presence of considerable amounts of ampicillin.

EXAMPLE 4

α-Azidobenzylpenicillin potassium salt (2.06 g.) was dissolved in water (7 ml.) and shaken for 2 minutes with Amberlite IR 120(H) (Registered trademark) ion exchange resin (2 g.). The resin was filtered off and washed with methanol (28 ml.). Tetramethyl ammonium chloride (3.29 g.) was dissolved in the combined water/methanol filtrate and the solution was electrolysed in the cathode compartment of a jacketed glass cell with a mercury cathode of surface area 12.3 cm.$^2$, and carbon anode. The anode compartment formed by a porous pot contained 2 ml. of water. Electrolysis was continued for 30 minutes at a current of 1 amp. The temperature of the solution in the cathode compartment was kept at 0–10° C. by circulation of a refrigerant in the cell jacket. The initial pH of the solution was 4.0. This rose to 6.8 after the first 4 minutes of electrolysis and the pH was subsequently kept at about 7 by additions of HCl solution (50% conc. HCl, 50% methanol) at 5 minute intervals.

After 20 minutes of electrolysis a heavy gelatinous precipitate formed in the cathode compartment. This prevented stirring of the solution during the final 10 minutes of the electrolysis. The solution had been gently stirred by a magnetic stirrer for the first 20 minutes of electrolysis.

At the end of electrolysis the gel was removed from the remaining solution and dried under vacuum over $P_2O_5$. Assay of the remaining solution showed that it contained 0.55 g. ampicillin. The solid (2.2 g.) obtained by drying the gel was assayed and found to contain 30% ampicillin. The total amount of ampicillin formed represents a yield of about 70% from the azidobenzylpenicillin.

EXAMPLE 5

The azidobenzylpenicillin solution was made and electrolysed as in Example 4, except that only 0.5 g. tetramethylammonium chloride was used. Electrolysis was continued for 30 minutes. The initial current was 0.2 amp., and this increased to 1 amp. after 15 minutes and was thereafter kept at 1 amp. The initial temperature was 13° C., and this increased to 20° C. after 10 minutes and was thereafter kept between 20 and 25° C. The initial pH was 4.0, and this increased to 6.0 after 15 minutes and was thereafter kept at 6.0–7.0 by addition of HCl. Assay of the electrolysis solution showed the presence of 1.33 g. ampicillin, a yield of about 80%.

EXAMPLE 6

Electrolysis was carried out as in Example 5, except for slight differences in temperature, current and pH. Electrolysis was continued for 45 minutes. The electrolysed solution was adjusted to pH 5.5 with HCl and stored at 5° C., when the whole solution formed into a gel. This was freeze dried and 2.15 g. solid obtained. This assayed at 58% ampicillin, representing a yield of about 72%. Two grams of the solid was boiled with 5 ml. water, cooled, filtered and the product dried over $CaCl_2$ under vacuum. The yield was 0.65 g., which assayed at 91% ampicillin representing a yield of about 33% from azidobenzylpenicillin. The i.r. spectrum showed the material to be mainly anhydrous crystalline ampicillin.

EXAMPLE 7

D-α-(o-nitrophenylsulphenamido)benzylpenicillin sodium salt (0.5 g., 50% pure) was dissolved in water (7 ml.) and shaken for 2 minutes with Amberlite IR 120(H) (Registered trademark) ion exchange resin (0.5 g.). The resin was filtered off and washed with methanol (28 ml.). Tetramethylammonium chloride (0.5 g.) was dissolved in the combined water/methanol filtrate and the solution was electrolysed for 1 hr. as in Example 4 with a current which rose from 0.1 amp. to 1 amp. in the first 10 minutes and was thereafter kept constant. The pH rose from 3 to 6 in the first 5 minutes and was thereafter kept at 6 to 7. The temperature rose from 18° to 22° C. in the first 5 minutes and was subsequently kept between 22 and 28° C. Paper chromatograms on samples taken after ½ hr. and 1 hr. of electrolysis showed the presence of ampicillin and the absence of the starting penicillin. Assay of the electrolysed solution showed that about 40 mg. of ampicillin had been formed, representing a yield of about 24%.

EXAMPLE 8

α-Azidobenzylpenicillin potassium salt (2.06 g.) and sodium sulphate (0.52 g.) were dissolved in water (35 ml.). This solution was electrolysed at a mercury cathode in the cell described in previous examples. Electrolysis was continued for 40 minutes with a current of 1 amp. and a temperature of 23–28° C. The pH was controlled at about 7 by periodic addition of HCl. After electrolysis the pH of the solution was adjusted to about 5, the solution evaporated to a low volume and kept at 5° C. for precipitation to occur. Filtration and air drying gave 483 mg. of material which was shown by its i.r. spectrum and by analysis to be ampicillin trihydrate. This represents an overall yield of 21% ampicillin.

EXAMPLE 9

α-Azidobenzylpenicillin potassium salt (2.07 g.) and sodium chloride (0.50 g.) were dissolved in water (35 ml.). The solution was electrolysed at a silver foil cathode of surface area 4.15 cm.$^2$. The cell used was the same as in the other examples, apart from replacement of the mercury pool electrode by the silver disc. Electrolysis was continued for 40 minutes at a current of 1 amp., a temperature about 25° C. and pH about 7.5. Paper chromatograms on the solution after electrolysis showed the presence of ampicillin and assay of the solution gave an amount of ampicillin corresponding to 33% yield from starting material.

EXAMPLE 10

α - (p-toluenesulphonylamino)-2-thienyl-methylpenicillin sodium salt (2.55 g.) was dissolved in water (7 ml.) and shaken for 2 minutes with Amberlite I.R. 120(H) resin (2 g.). The resin was filtered off and washed with methanol (28 ml.). Tetramethyl ammonium chloride (0.50 g.) was dissolved in the combined water/methanol filtrate and the solution was electrolysed at a mercury cathode in the normal way. Electrolysis was continued for 1 hr. at a current of 1 amp., temperature about 26° C. and pH about 7. Paper chromatograms on the final solution showed the presence of α-amino-2-thienyl methylpenicillin and assay indicated a yield of about 37% from starting material.

EXAMPLE 11

A solution of α-azidobenzylpenicillin (from 2.06 g. of the potassium salt) in 20% water in methanol was prepared as in earlier examples. Lithium chloride (0.5 g.) was dissolved in the solution which was electrolysed as described previously, with a mercury cathode and a carbon anode. Electrolysis was continued for 40 minutes at a current of 1 amp., with the pH kept at about 7 and the temperature at about 25° C. Analysis of the solution after electrolysis showed the presence of about 0.23 g. ampicillin, corresponding to a yield of about 16%.

EXAMPLE 12

Potassium α-azidobenzylpenicillin (2.06 g.) was dissolved in water (35 ml.) together with ammonium sulphate (0.5 g.). The solution was electrolysed for 40 minutes at a current of 1 amp. with a mercury cathode and carbon anode. The temperature was kept at about 25° C. and the pH at about 8. Analysis of the solution showed the presence of about 0.84 g. ampicillin, corresponding to a yield of about 51%.

EXAMPLE 13

A solution of α-azidobenzylpenicillin (from 2.06 g. of the potassium salt) in 20% water in acetone was prepared as described previously for solutions in aqueous methanol. Tetramethylammonium chloride (0.5 g.) was dissolved in the solution, which was then electrolysed for 40 minutes at a current of 0.6 to 0.8 amp. with a mercury cathode and carbon anode. The temperature was maintained at about 25° C. and the pH at about 5. Analysis of the solution showed the presence of about 1.0 g. ampicillin, corresponding to a yield of about 60%.

What is claimed is:

1. A method for preparing a penicillin of the Formula I:

$$\underset{\underset{NH_2}{|}}{R-CHCO.NH-CH-CH} \underset{O=C-N-CH.CO_2H}{\overset{S}{\diagup}\overset{}{\underset{}{\diagdown}}\overset{CH_3}{\diagup}} \quad (I)$$

or a non-toxic salt thereof wherein R is phenyl, substituted phenyl or thienyl which comprises electrolytically reducing a penicillin of the Formula II:

$$\underset{\underset{Y}{|}}{R-CH.CO.NH.CH-CH} \underset{O=C-N-CH.CO_2M}{\overset{S}{\diagup}\overset{}{\underset{}{\diagdown}}\overset{CH_3}{\diagup}} \quad (II)$$

wherein R is as defined above and Y is azido, arylsulphonamido, arylsulphenamido, or arylcarbonylamino, and M is a hydrogen atom or a non-toxic metal or ammonium or substituted ammonium ion.

2. A method according to claim 1 wherein Y is azido, toluene-p-sulphonamido, benzamido, or p-nitrophenylsulphenamido.

3. A method according to claim 1 wherein Y is azido.

4. A method according to claim 1 wherein R is phenyl.

5. A method according to claim 1 wherein the penicillin of Formula II and an electrolyte are dissolved in a liquid solvent which will not chemically react with either the penicillin of Formula I or II, the electrolyte solution is maintained at a pH in the range 1 to 9 during the course of the electrolysis and a metal cathode is used.

6. A method according to claim 5 wherein the pH is maintained in the range 2 to 7.

7. A method according to claim 5 wherein the electrolyte is selected from the group consisting of quaternary ammonium salts, ammonium salts and alkali metal salts.

8. A method according to claim 5 wherein the electrolyte is selected from the group consisting of tetramethylammonium salts and lithium chloride.

9. A method according to claim 5 wherein the liquid solvent is selected from the group consisting of alcohols, aqueous alcohols, aqueous acetone and water.

10. A method according to claim 5 wherein the metal cathode is selected from the group consisting of mercury, zinc, lead, lead amalgam, zinc amalgam and silver.

11. A method according to claim 5 wherein Y is toluene-p-sulphoamido, the solvent is methanol or aqueous methanol containing up to 30% by volume of water, the electrolyte is a quaternary ammonium salt and the cathode is mercury.

12. In a method for the preparation of a penicillin of the Formula I:

$$\underset{\underset{NH_2}{|}}{R-CHCO.NH-CH-CH} \underset{O=C-N-CH.CO_2H}{\overset{S}{\diagup}\overset{}{\underset{}{\diagdown}}\overset{CH_3}{\diagup}} \quad (I)$$

or a non-toxic salt thereof wherein R is phenyl, substituted phenyl or thienyl, the step which comprises electrolytically reducing a penicillin of the Formula II:

$$\underset{\underset{Y}{|}}{R-CH.CO.NH.CH-CH} \underset{O=C-N-CH.CO_2M}{\overset{S}{\diagup}\overset{}{\underset{}{\diagdown}}\overset{CH_3}{\diagup}} \quad (II)$$

wherein R is as defined above and Y is azido, arylsulphonamido, arylsulphenamido, or arylcarbonylamino, and M is a hydrogen atom or a non-toxic metal or ammonium or substituted ammonium ion.

13. The method according to claim 12 wherein the electrolytic reduction is a cathodic reaction in which the penicillin of Formula II and an electrolyte are dissolved in a liquid solvent inert to the starting and resulting penicillin, the electrolyte being maintained at a pH of 1 to 9 during electrolysis and being related to the solubility of the penicillin of Formula II.

References Cited

UNITED STATES PATENTS

| | | | |
|---|---|---|---|
| 1,926,837 | 9/1933 | Cupery | 204—74 |
| 2,589,635 | 3/1952 | Smith et al. | 204—74 |

HOWARD S. WILLIAMS, Primary Examiner

H. M. FLOURNOY, Assistant Examiner

U.S. Cl. X.R.

204—59